2 Sheets--Sheet 1.

W. C. B. RICHARDSON.
Rotary-Spaders.

No. 166,721. Patented Aug. 17, 1875.

Witnesses.
A. F. Cornell
W. Haye

Inventor.
Wm. C. B. Richardson
Per Burridge & Co.
Attorneys.

2 Sheets--Sheet 2.

W. C. B. RICHARDSON
Rotary-Spaders.

No. 166,721.

Patented Aug. 17, 1875.

Witnesses:
A. F. Cornell.
W. Haye

Inventor:
Wm. C. B. Richardson.
Per Burridge & Co.
Attorneys.

UNITED STATES PATENT OFFICE.

WILLIAM C. B. RICHARDSON, OF CLEVELAND, OHIO.

IMPROVEMENT IN ROTARY SPADERS.

Specification forming part of Letters Patent No. 166,721, dated August 17, 1875; application filed January 11, 1875.

*To all whom it may concern:*

Be it known that I, WILLIAM C. B. RICHARDSON, of Cleveland, in the county of Cuyahoga and State of Ohio, have invented a certain new and Improved Rotary Spader; and I do hereby declare that the following is a full, clear, and complete description thereof, reference being had to the accompanying drawings making part of the same.

Figure 1:
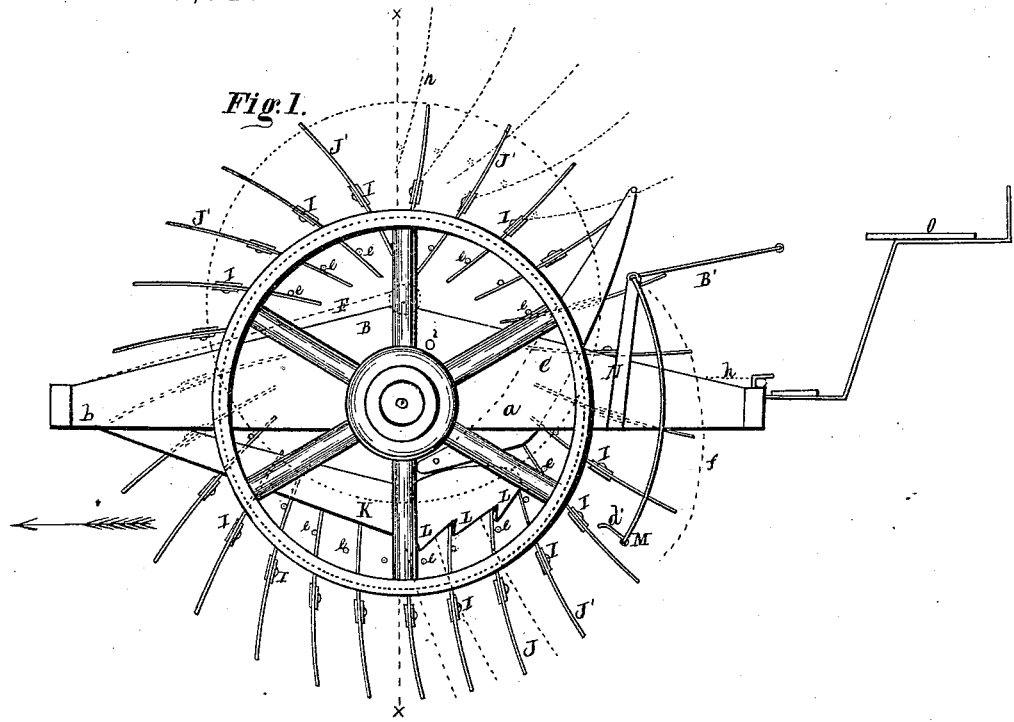
Figure 2:
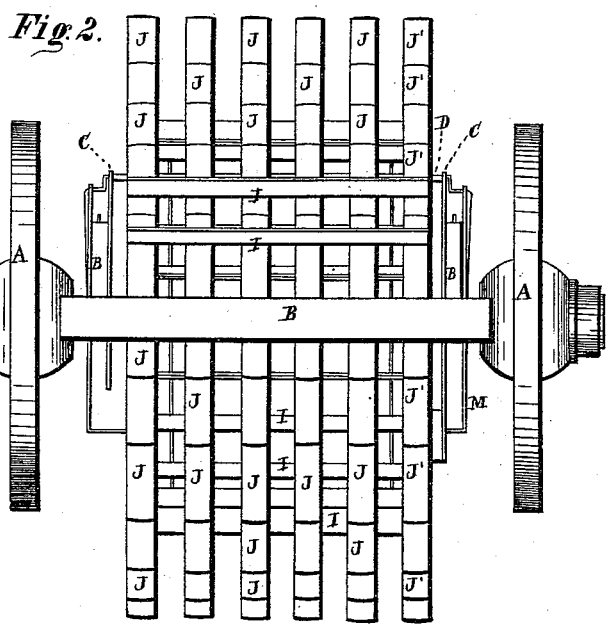
Figure 3:
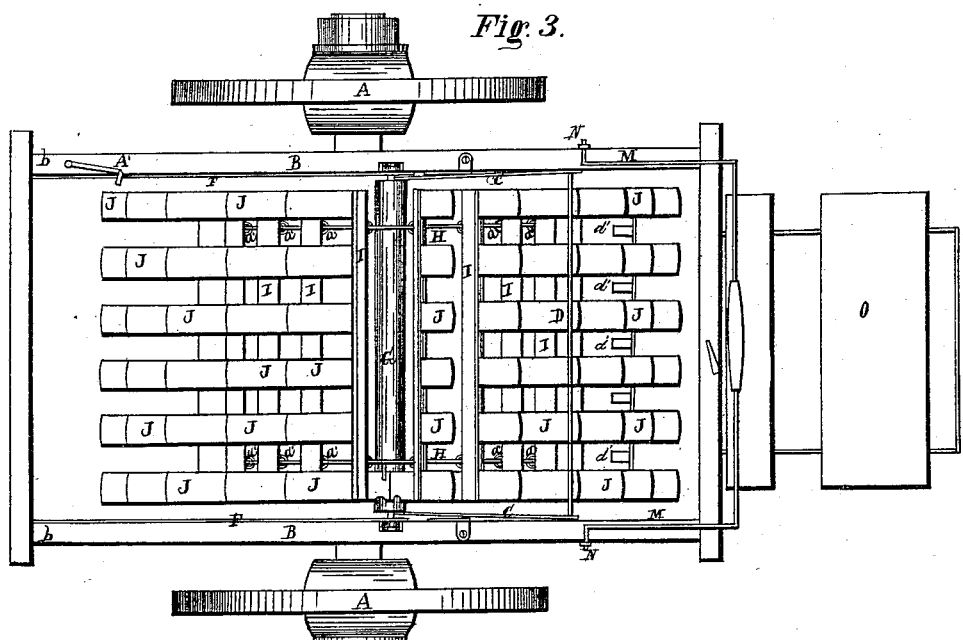
Figure 4:
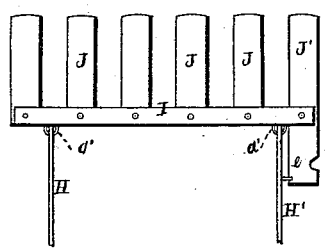
Figure 5:
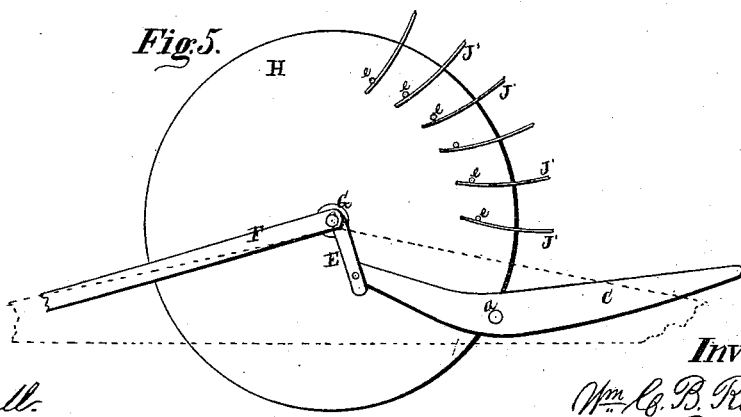

Figure 1 is a side elevation of the machine. Fig. 2 is an end elevation. Fig. 3 is a plan view. Figs. 4 and 5 are detached sections.

Like letters of reference refer to like parts in the several views.

This machine is for digging the ground for tillage, and consists of a frame mounted upon a pair of wheels. Within said frame is journaled a pair of wheels or centers, having attached to their periphery a series of gangs of spades, which, by their peculiar shape and position, enter the ground, thereby cutting and lifting the soil. In connection therewith is arranged a shaker and a scraper, for shaking the spades and removing weeds, &c., therefrom.

A more full and detailed description of the machine will be found as follows: On the wheels A A, Fig. 2, is mounted a frame, B, so that it may vibrate on the axle of the wheels. On the inside of each of the sides of the frame is pivoted, at about the point a, Fig. 1, a lever, C, Figs. 1 and 5. The outer ends of said levers are connected to each other by a bar, D, Fig. 3. To the inner end of each of said levers is pivoted a link, E, Fig. 5, also indicated by the dotted lines m, Fig. 1. To the upper end of the links is attached, respectively, one end of an arm, F, Figs. 3 and 5, whereas the opposite end of the arm is pivoted to the inside of the frame near b. At the junction of the arms F with the upper end of the links E is journaled a shaft, G, Fig. 3, whereon is firmly secured the centers H H', Figs. 2 and 5, also indicated by the dotted line in Fig. 1. To the periphery of said centers are attached a series of bars, I, Figs. 3 and 4, by means of a loop, d', secured to the bars and passed through the edge of the centers, as shown in Fig. 4, whereby the bars are allowed a free vibratory movement in direction of the circumference of the centers. To the bars referred to are secured, in a rigid manner, a series of spades, J, projecting radially from the centers, as shown in the drawings. One end of the outer circumferential series of spades J' descends below the periphery of the centers, as will be seen in Fig. 4. The part of the spades J' inside of the bar, to which they are secured, is made to engage pins e, whereby the outer ends of the spades are prevented from falling down below the periphery of the centers, and are also thereby held firmly in position while they are engaged in the ground in the act of digging, as will hereinafter be shown. K, Fig. 1, is a shaker, one end of which is pivoted to the inside of the frame A, near the point b. The opposite end of the shaker reaches forward beyond the axial line of the shaft G, and rests upon the inner ends of the spades J', as shown in said Fig. 1. It will be observed that the free end of the shaker is provided with hooks or notches L, whereby the ends of the spades J' are caught and shaken, as and for the purpose presently shown. M is a self-adjusting scraper, consisting of a frame hung in the standards N. To the lower side of the frame is secured a series of hoes, d', Fig. 1.

The operation of the above-described spading-machine is substantially as follows: The position of the machine, as shown in Fig. 1, is such as when in practical use. The wheels A are supposed to be resting upon the surface of the ground, while the lowermost spades are in the ground, and those immediately on each side are either entering the ground or leaving it.

The machine moves forward in direction of the arrow, guided by the driver mounted on the seat O. As the machine moves along the spades in front of the vertical line x x, Fig. 1, are retained in the position shown by the inner ends of the circumferential series of spades J' resting against the pins e, as will be seen in said Fig. 1. The spades enter the ground while in the position shown in front or left of the line x x. The forward movement of the machine and the weight of the spades still hold them in said position until about to the line x x, at which point they begin to change position by the inner end of the spades passing from the pins against which they leaned on the left of the line x x to the pins on the right of said line, as will be seen in Fig. 1, thereby bringing the concave face of the inner end of the spades against the pins. This change of position is due in part to the dirt lifted by the spades as they commence to rise out of the ground, also by their gravity, and which position they retain until they have passed the upper end of the line $x\,x$, at which point, by their gravity, they fall over to the position first described for entering the ground, as will be seen in Fig. 1. The spades being but a few inches wide, most of the dirt naturally falls therefrom of itself on coming to the surface; but in order to secure the entire removal of all the dirt from the spades they are given a quick and sudden shake by the shaker K, above referred to, which, as the spades revolve, catches the inner ends of the spades J' by the hooks L, thereby drawing the ends in contact with the pins $c$ back therefrom, as indicated by the dotted lines $i$, which, as the spades continue to rotate, slip from the hooks and fall against the pins, thereby receiving a sudden jar, causing the dirt to fall from them. Should any weeds, &c., remain upon the spades they are scraped off by the hoes $d'$ referred to, which, owing to the superior weight of the projecting part B' of the frame M, the lower side or part of the frame to which the hoes are attached is thrown inward, as shown in Fig. 1, which, however, is forced outward by the inclined position of the spades, over which the bar of the scraper slides outward, as indicated by the dotted line $f$, thereby drawing the hoes outward between the spades, carrying with them weeds and other such like material that may have lodged upon them. The scraper falls in again the moment it slips from off the ends of the spades, and again is carried out by the next course of spades. By the action of the shaker and that of the scraper the spades are thoroughly cleaned of dirt, weeds, &c., so that they are free to enter the ground in the order of their rotation, and in the position shown in Fig. 1, in which it will be seen that the lower spades are nearly parallel, in which position they enter the ground, and on arriving to about the line $x\,x$ they are caught by the shaker and suddenly jerked back, thereby loosening them in the ground, and at the same time shaking off the dirt from those just out of the ground.

This machine can be moved from place to place on the wheels A by elevating the spades above the ground. This may be done by depressing the arms C to the position indicated by the dotted line $h$, Fig. 1, also shown in Fig. 5, and making it fast to the frame. The position of the spades when elevated for moving the machine is indicated by the dotted lines $n$, which represents the centers and spades raised from the ground for being moved away on the wheels A A. On the front end of the frame is arranged a shaker, A', Fig. 2, which the spades as they revolve strike, and thereby are shaken, causing the dirt, if any, upon them, to fall off. This shaker may or may not be used, as the nature of the ground may determine. A pin, $i'$, is inserted through the sides of the frame beyond the levers C, to prevent the spades from lifting above the frame while they are engaged in the ground.

What I claim as my invention, and desire to secure by Letters Patent, is—

1. In combination with the hinged spades J J', the scraper, consisting of the pivoted frame M and hoes $d'$, arranged to operate substantially as described, and for the purpose specified.

2. The shaker K, as arranged in relation to, and in combination with, the spades J', as and for the purpose specified.

W. C. B. RICHARDSON.

Witnesses:
W. H. BURRIDGE,
J. H. BURRIDGE.